United States Patent
Yoshida et al.

(10) Patent No.: US 8,090,993 B2
(45) Date of Patent: Jan. 3, 2012

(54) I/O UNIT AND INDUSTRIAL CONTROLLER

(75) Inventors: Katsufumi Yoshida, Ibaraki (JP);
Toshiyuki Nakamura, Ritto (JP)

(73) Assignee: Omron Corporation, Kyoto (JP)

( * ) Notice: Subject to any disclaimer, the term of this patent is extended or adjusted under 35 U.S.C. 154(b) by 15 days.

(21) Appl. No.: 12/712,869

(22) Filed: Feb. 25, 2010

(65) Prior Publication Data
US 2010/0235682 A1    Sep. 16, 2010

(30) Foreign Application Priority Data

Mar. 12, 2009 (JP) ................................ 2009-059324
Jan. 19, 2010 (JP) ................................ 2010-009338

(51) Int. Cl.
*G06F 11/00* (2006.01)
(52) U.S. Cl. ........................................... 714/44; 714/25
(58) Field of Classification Search .................. 714/25, 714/44
See application file for complete search history.

(56) References Cited

U.S. PATENT DOCUMENTS

| | | | |
|---|---|---|---|
| 7,010,450 B2* | 3/2006 | Law et al. | 702/108 |
| 7,657,814 B2* | 2/2010 | Schuster et al. | 714/746 |
| 7,684,877 B2* | 3/2010 | Weatherhead et al. | 700/21 |
| 2006/0248509 A1* | 11/2006 | Gunnmarker et al. | 717/120 |
| 2007/0288674 A1* | 12/2007 | Ikeno | 710/110 |

FOREIGN PATENT DOCUMENTS

| | | |
|---|---|---|
| EP | 0 292 914 A1 | 11/1988 |
| EP | 1 703 348 A2 | 9/2006 |
| EP | 1 717 654 A2 | 11/2006 |
| JP | 2005-243008 | 9/2005 |

OTHER PUBLICATIONS

European Patent Office extended search report and search opinion on application No. 10154186.0 dated Feb. 14, 2011; 7 pages.

* cited by examiner

*Primary Examiner* — Charles Ehne
(74) *Attorney, Agent, or Firm* — Foley & Lardner LLP (57) ABSTRACT

This invention enables setting of a diagnosis algorithm of a safety device to be easily carried out. A slice I/O unit stores a plurality of diagnosis algorithms each corresponding to a different safety device in an ASIC, and stores specifying information for specifying a diagnosis algorithm to use of the plurality of diagnosis algorithms in a register of the ASIC. The slice I/O unit performs diagnosis of a connected safety device using the diagnosis algorithm specified by the specifying information stored in the register of the plurality of diagnosis algorithms. The diagnosis algorithm to use can be selected by selecting a number, and the like, which is preferable as a setting process at a setting tool device can be facilitated and a human error does not occur.

9 Claims, 6 Drawing Sheets

I/O UNIT AND INDUSTRIAL CONTROLLER

BACKGROUND OF THE INVENTION

This application is based on Japanese Patent Application Nos. 2009-059324 and 2010-009338 filed with the Japan Patent Office on Mar. 12, 2009 and Jan. 19, 2010, respectively, the entire content of which is hereby incorporated by reference.

TECHNICAL FIELD

The present invention relates to an I/O unit and an industrial controller, and in particular, to a diagnosis function of an I/O device connected to the I/O unit.

RELATED ART

A network system in FA (Factory Automation) has one or a plurality of PLCs (Programmable Logic Controller) responsible for control of an input device and an output device of an industrial robot and other production facilities arranged inside a production factory, and a device having an operation controlled by the PLC, connected to a network of a control system. The PLC and the device communicate through the network of the control system to transmit and receive IN data and OUT data (hereinafter referred to as I/O data), and control the production facilities.

More specifically, the control in the CPU unit of the PLC inputs an ON signal or an OFF signal of the input device, performs logical operation on the inputted ON/OFF information with a user program, and outputs the operation result to the output device. Such output becomes an operation instruction on the output device to thereby operate the output device, so that the production facilities are controlled.

There is a demand to perform diagnosis on the I/O device such as the input device and the output device at an appropriate timing. Such diagnosis normally includes connecting a monitor device to the PLC and monitoring the IO memory of the PLC storing the IO data of the I/O device to confirm the state of the I/O device and determine whether the I/O device is normally operating.

A diagnosis system disclosed in Japanese Unexamined Patent Publication No. 2005-243008 is known to perform the diagnosis on the input device side and the output device side. Such a diagnosis system creates a diagnosis algorithm that complies with the input device and the output device, which become the target, using a setting tool device, and downloads and sets the created diagnosis algorithm in the input device and the output device. At the time of the actual operation, the input device and the like execute the diagnosis algorithm to determine presence of abnormality, and the like, and output the diagnosis result through the network. The diagnosis algorithm includes a diagnosis application program, and parameters used when executing the application program. The diagnosis performed herein includes measuring the time until the output device operates from when a sensor or the input device is turned ON, the operation time of the output device, and the like, and determining whether or not the measurement result is within a reference value.

A fail safe (safe) system is recently being introduced for the control by the PLC. That is, in addition to the PLC and each device itself, the network connecting the PLC and the device is also configured to incorporate the safety function. The safety function ensures the safety of a worker when an emergency stop switch is pushed or when a sensor of a light curtain and the like detects entering of a person (part of the body), and duplicates the CPU and other processing units, so that the fail safe operates even when failure occurs in a safety related control unit and the system shifts to the safety side to stop the operation.

This type of safety control system includes a safety controller complying with the safety standard, a safety remote terminal, and an I/O device, and is used with a cutting machine, a disconnecting machine, a manufacturing machine robot with arms, and the like. The safety controller incorporates a self-diagnosis function in terms of safety in addition to the logic operation function similar to the general programmable controller (PLC) and the input/output control function to ensure high safety and reliability in the control. The safety controller has a function (fail safe function) of forcibly performing a safe control so that its control does not lead to danger when abnormality is detected by the self-diagnosis result. The safety remote terminal also has a self-diagnosis function, and has a fail safe function of performing a control so that its control does not lead to danger when abnormality is detected by the self-diagnosis result. The safety control system thus prevents the operation of a manufacturing machine robot and the like from leading to danger.

Safety as referred to herein more specifically has a meaning including a standardized safety standard. The safety standard includes, for example, IEC 61508 and EN standard. In the IEC 61508 (International Electro-technical commission related to the function safety of the programmable electronic system), a danger failure probability per time (Probability of Failure per Hour) is defined, and an SIL level (Safety Integrity Level) is classified into four levels depending on such probability. In the EN standard, evaluating the magnitude of the risk of the machine and carrying out countermeasures for reducing the risk are made mandatory, and five safety categories are defined in the ISO 13849-1. The safety controller, the safety control system, and the like as referred to herein correspond to such a safety standard. The safety control system is sometimes referred to as "safety control system", and the safety controller is sometimes referred to as "safety controller" or "safety control device".

If the safety controller is a building block type, each unit is connected to a common internal bus to communicate through the bus with the CPU unit responsible for the control of the entire safety controller, and exchange data. The coupled I/O unit also includes a connection terminal, where the input device for safety application or the output device for safety application is connected to the connection terminal. The safety controller inputs the input signal of the input device inputted from the safety remote terminal through network communication, or the input signal of the input device connected to the coupled I/O unit, and performs logical operation on the ON/OFF of the input signal by a logic program stored in advance. The output signal based on the operation result is outputted to the safety remote terminal and the I/O unit. The I/O unit and the like output the output signal to the output device. The series of operations are repeatedly executed so that the entire system including the manufacturing machine robot can be controlled by the safety controller.

The logic program, which becomes the target of logic operation process in the safety controller or the CPU unit, is created in advance by a programmer. The programming description in creating the program may be a ladder, function block diagram, sequential function chart, structured text, instruction list, and the like. The programming language may be an interpreter language, script language, assembly language, high-level language, Java (registered trademark), and the like. A source code written with such a programming language is subjected to processing such as assembly and compiling, and then executed by the CPU.

A safety relay and a contactor as the output device connected to the I/O unit and the safety remote terminal are connected to the manufacturing machine robot, a processing machine, a disconnecting machine, and the like. The manufacturing machine robot and the like operate when the main contact of the relay and the contactor is turned ON, and the manufacturing machine robot and the like stop when the contact is turned OFF. Thus, the safety controller performs the control related to the stopping of the operation of the operation robot and the like to be ultimately controlled by ON/OFF controlling the output device. Describing with a specific example, when a signal indicating that the emergency stop switch is normally operated is inputted, the safety controller turns OFF the output device (relay and contactor) so that the controlling target does not perform a dangerous operation or forcibly controls to the state on the safety side and immediately takes necessary safety actions. When a diagnosis result that the emergency stop switch or other input device is abnormal is inputted, the safety controller turns OFF the output device to stop the operation so that the controlling target does not perform a dangerous operation regardless of the presence of operation of the emergency stop switch or the ON/OFF state of the input device.

The safety control system needs to diagnose whether the safety device such as the input device and the output device connected to the PLC directly or through the network is normal to reliably transition to the safety state at the time of an emergency. To perform such a diagnosis, a highly sophisticated unique diagnosis algorithm complying with the input device and the output device of each safety application (hereinafter collectively referred to as "safety device") is necessary, and not only simply measuring the operation time and the like as in the diagnosis algorithm disclosed in Japanese Unexamined Patent Publication No. 2005-243008. Thus, a configuration in which a dedicated diagnosis controller complying with each safety device is prepared, and the diagnosis controller complying with the relevant safety device is arranged between the PLC and the safety device is adopted.

The invention disclosed in Japanese Unexamined Patent Publication No. 2005-243008 saves a diagnosis algorithm in an input device and an output device, and thus the diagnosis algorithm needs to be again downloaded to a replaced input device and the like from a setting tool device if the input device and the like breaks down and is replaced, and hence the invention is cumbersome.

Furthermore, when creating the diagnosis algorithm in the setting tool device, this is effective when creating a flexible diagnosis algorithm, but is cumbersome when the number of diagnosis algorithms and parameter setting become large, and furthermore, an effective diagnosis may not be performed due to a human error such as an error in the setting of the parameter. Moreover, in the diagnosis algorithm of the safety device, in particular, creation of the diagnosis algorithm including the setting of the parameter is very cumbersome due to properties thereof, and the safety state may not be ensured when the human error is taken into consideration.

As a specific problem of the safety control system described above, a dedicated controller for diagnosing the safety device needs to be prepared for every safety device, and needs to be attached separately from the safety device and the PLC. Therefore, cumbersome tasks in manufacturing and storing a plurality of different types of dedicated controllers, an increase in working steps when building the safety control system at a site, and a place for installing the dedicated controller are necessary.

SUMMARY

In accordance with one aspect of the present invention, in order to solve the above-described problems, an I/O unit according to the present invention is (1) an I/O unit for an industrial controller including a connection terminal for connecting an I/O device as an input device and an output device, and a control unit for inputting/outputting an I/O signal with the I/O device. The I/O unit includes: a storage unit for storing a plurality of diagnosis algorithms each corresponding to a different I/O device; a specifying information storage unit for storing specifying information for specifying the diagnosis algorithm to use of the plurality of diagnosis algorithms; a diagnosis unit for performing a diagnosis of the I/O device connected to the connection terminal using the diagnosis algorithm specified by the specifying information stored in the specifying information storage unit of the plurality of diagnosis algorithms; and a unit for executing an abnormality process when a diagnosis result of the diagnosis unit is abnormal. (2) The connection terminal may be provided in plurals, and the specifying information may be set for every connection terminal.

The connection terminal corresponds to "input/output terminals $13c$, $14c$" in the embodiment. The specifying information storage unit corresponds to "register $21$" in the embodiment. The storage unit corresponds to "ASIC $13a$, $14a$" in the embodiment. The abnormality process includes various processes such as stopping the operation on its own, notifying abnormality to the CPU unit, storing that abnormality occurred, and performing the abnormality process in the safety control system. The specifying information corresponds to "diagnosis algorithm setting information" in the embodiment. The industrial controller is realized by a safety-compliant safety controller in the embodiment, but in addition to high-speed property, high function, and function expandability of the personal computer referred to as a general programmable controller (PLC) and a PAC (Programmable Automation Controller), includes various types of controllers other than the controller having high accuracy and durability of the PLC. The I/O unit corresponds to the slice I/O unit (slice In unit $13$, slice Out unit $14$) in the embodiment.

A plurality of diagnosis algorithms are provided to the I/O unit and one of which is specified by the specifying information, and thus the setting at the setting tool can be facilitated. The diagnosis algorithm may be originally stored and held instead of using the setting tool device and the like, and thus the setting task of making the diagnosis function operable can be easily carried out since the specifying information merely needs to be set even when replacing with the same type of I/O unit due to failure and the like. Since a plurality of diagnosis algorithms are arranged in one I/O unit, the dedicated controller, which is necessary for every safety device (I/O device) in the safety control system, becomes unnecessary, and a plurality of safety devices can be responded with a single I/O unit. Since the diagnosis algorithm is held in the I/O unit, the diagnosis algorithm can remain being held even if replaced to the same type of I/O device with failure.

(3) The industrial controller according to the present invention includes the I/O unit according to (1) or (2), and a CPU unit, wherein the CPU unit has a function of storing and holding the specifying information, and setting the stored and held specifying information to the I/O unit. In this manner, the CPU unit can perform the setting of the specifying information with respect to the I/O unit when replaced with a new I/O unit with occurrence of failure of the I/O unit, and hence the I/O unit can be easily set to the same setting as in the state before the failure without using the setting tool device.

(4) The CPU unit may have I/O unit connection information for specifying identification information and an attaching position of the I/O unit to be connected; and the CPU unit may have a function of referencing the I/O unit connection information and transmitting the specifying information when confirmed as a correct I/O unit in setting the specifying information to the I/O unit. Therefore, a wrong setting is suppressed from being made on different I/O units as much as possible.

(5) The CPU unit may have a function of setting the I/O unit to operable when the specifying information is normally transmitted to the I/O unit. The determination on whether or not normally transmitted is made by whether or not the check sum values match in the embodiment, but other methods may be used. It is safe since the I/O unit does not operate if the diagnosis algorithm is not correctly set.

(6) The I/O unit may have a function of determining whether or not the specifying information from the CPU unit is normally received, and disabling the control unit from operating when not normally received. Determination is made by whether or not the check sum values match in the embodiment, but other methods may be used. It is safe since the I/O unit does not operate if the diagnosis algorithm is not correctly set.

(7) The CPU unit may have a function of starting the setting to the I/O unit with one of startup, pushing of a switch, or reception of an execution command from a setting tool device connected to the CPU unit as a trigger.

The present invention can connect a plurality of safety devices with a single I/O unit, and thus can reduce maintenance members. Resetting from the setting tool is not necessary and changes can be made at the time of I/O unit failure, and thus the down time of the entire system can be alleviated. In the application of the safety control system, the safety of the safety device, the diagnosis algorithm, and the like can be guaranteed. In other words, assuming that the safety of the diagnosis algorithm already held by the I/O unit is guaranteed, the specifying information such as a number merely needs to be specified, and hence authentication of safety does not need to be carried out with designing of the diagnosis algorithm.

DETAILED DESCRIPTION

Figure 1:
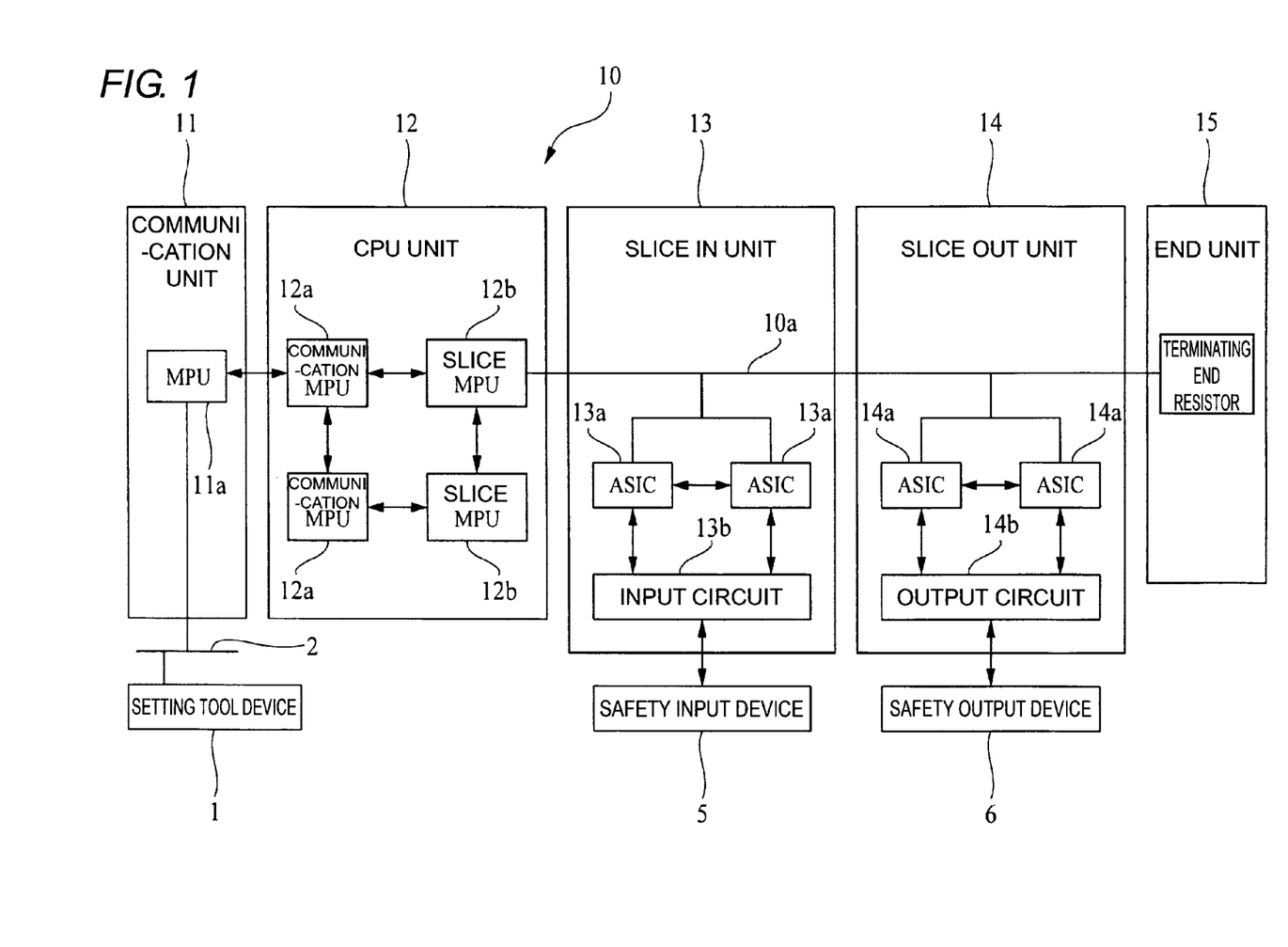
FIG. 1 is a view showing one preferred embodiment of a safety controller, which is one mode of a programmable controller according to the present invention.

FIG. 1 shows one suitable embodiment of a safety controller 10, which is one mode of a programmable controller according to the present invention. The safety controller 10 incorporates a self-diagnosis function in terms of safety in addition to a logic operation function and an input/output control function similar to a general programmable controller (PLC), so that high safety and reliability can be ensured in the control. The safety controller has a function (fail safe function) of forcibly performing a safe control so that its control does not lead to danger when abnormality is detected by a self-diagnosis result.

The safety controller 10 is a building block type and a configuration in which a communication unit 11, a CPU unit 12, a slice In unit 13, a slice Out unit 14, and an end unit 15 are coupled is shown in FIG. 1, but this does not inhibit other various types of units from being coupled. The installing number of each unit is arbitrary. Each unit is connected through an internal bus (PLC bus) 10a, and exchanges data by bus communicating with the CPU unit 12 responsible for the control of the entire safety controller.

The communication unit 11 is connected to a field bus 2, and communicates with external apparatuses and devices connected to the field bus 2. In relation with the present invention, the communication unit 11 has a function of communicating with a setting tool device 1 connected to the field bus 2. An MPU 11a of the communication unit 11 has a function of controlling transmission and reception of data with the setting tool device 1, and sending the data received from the setting tool device 1 to the CPU unit 12. The MPU 11a obviously executes a normal function serving as the communication unit 11.

The slice I/O unit such as the slice In unit 13 and the slice Out unit 14 includes ASICs 13a, 14a for executing processes as the I/O unit. The processes in the ASICs 13a, 14a include input/output of an I/O signal with a connected safety device (safety input device 5, safety output device 6), and transmission/reception of I/O data with the CPU unit 12 through the internal bus 10a. The slice I/O unit is safety compliant, and thus the ASICs 13a, 14a are duplicated. Although not illustrated, the MPU for executing the operation process the ASIC cannot comply, RAM used as a work memory when the MPU executes the operation, and other memories may be arranged.

Figure 2:
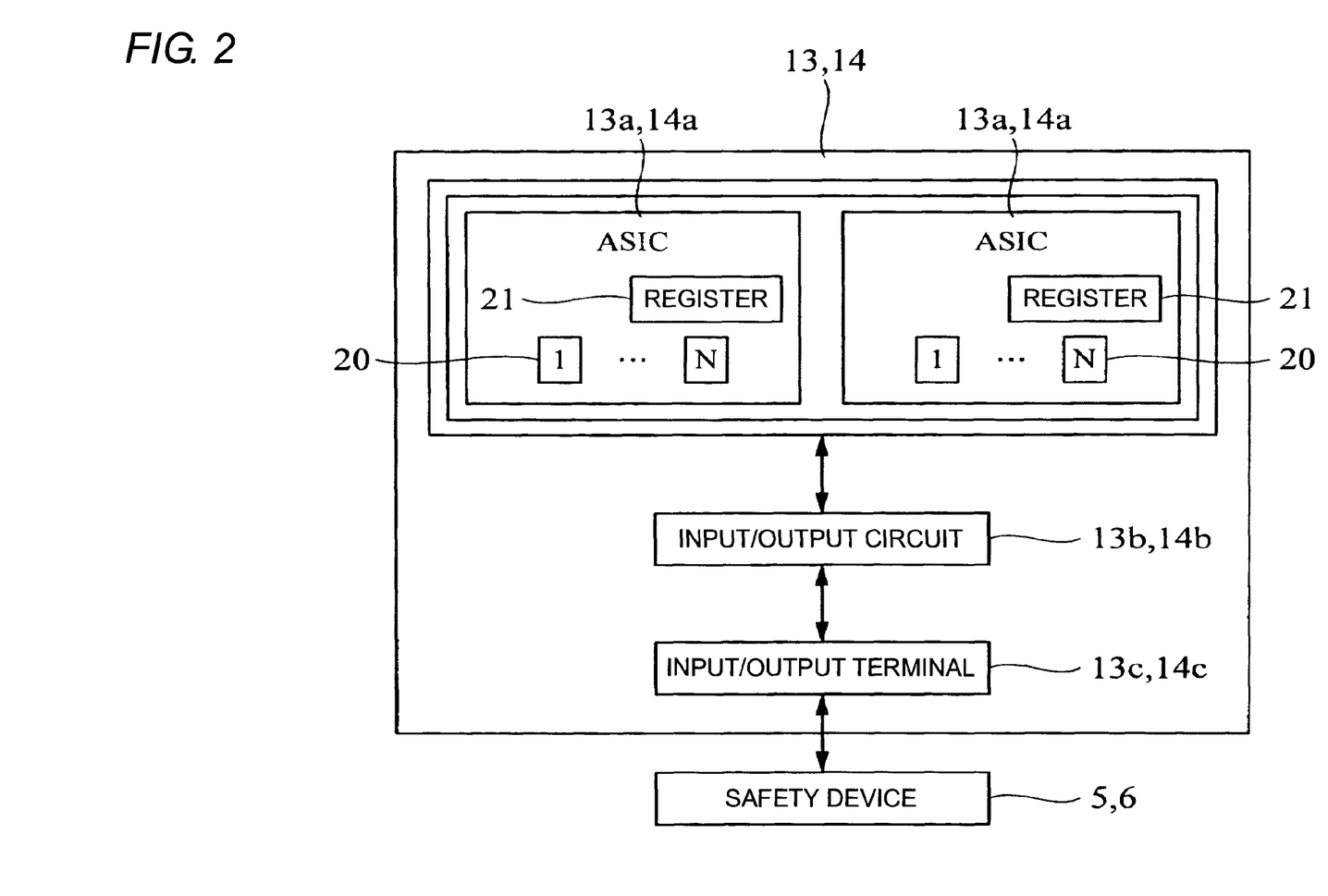
FIG. 2 is a view showing an internal configuration of a slice I/O unit.

The slice In unit 13 is connected with the safety input device 5 through an input circuit 13b, and the IN signal from the safety input device 5 is retrieved to the ASIC 13a through the input circuit 13b. The slice Out unit 14 is connected with the safety output device 6 through an output circuit 14b, and the OUT signal outputted from the ASIC 14a is provided to the safety output device 6 through the output circuit 14b. As shown in FIG. 2, the safety devices 5, 6 are connected to input/output terminals 13c, 14c arranged at a predetermined position of each unit 13, 14, and transmit and receive the I/O signal with the ASICs 13a, 14a through the input/output circuits 13b, 14b.

In the present invention, a plurality of types of (N) diagnosis algorithms 20 are stored and held in advance in the ASICs 13a, 14a. The plurality of diagnosis algorithms 20 respectively correspond to various types of safety devices that can be connected. In the present embodiment, the plurality of diagnosis algorithms 20 are uniquely specified with a number. That is, the ASICs 13a, 14a have a function of executing a diagnosis algorithm specified by the number stored in an internal register 21 at an appropriate timing, and performing a diagnosis on the connected safety device. When determined as abnormal as a result of the diagnosis, the slice I/O unit executes an abnormality process defined in advance. The abnormality process may stop the operation on its own, notify abnormality to the CPU unit 12, or store that abnormality has occurred. The function of executing the abnormality process may be incorporated in the ASIC, or may be performed by the MPU that is separately mounted.

Therefore, the slice I/O unit of the present embodiment has a diagnosis function of a plurality of safety devices and specifies the diagnosis algorithm that is selectively used, and thus does not have a complex setting. Since the operation of the specified diagnosis function is performed according to the parameter setting from the CPU unit 12, manpower is not interposed and failure due to human setting error does not occur.

Figure 3:
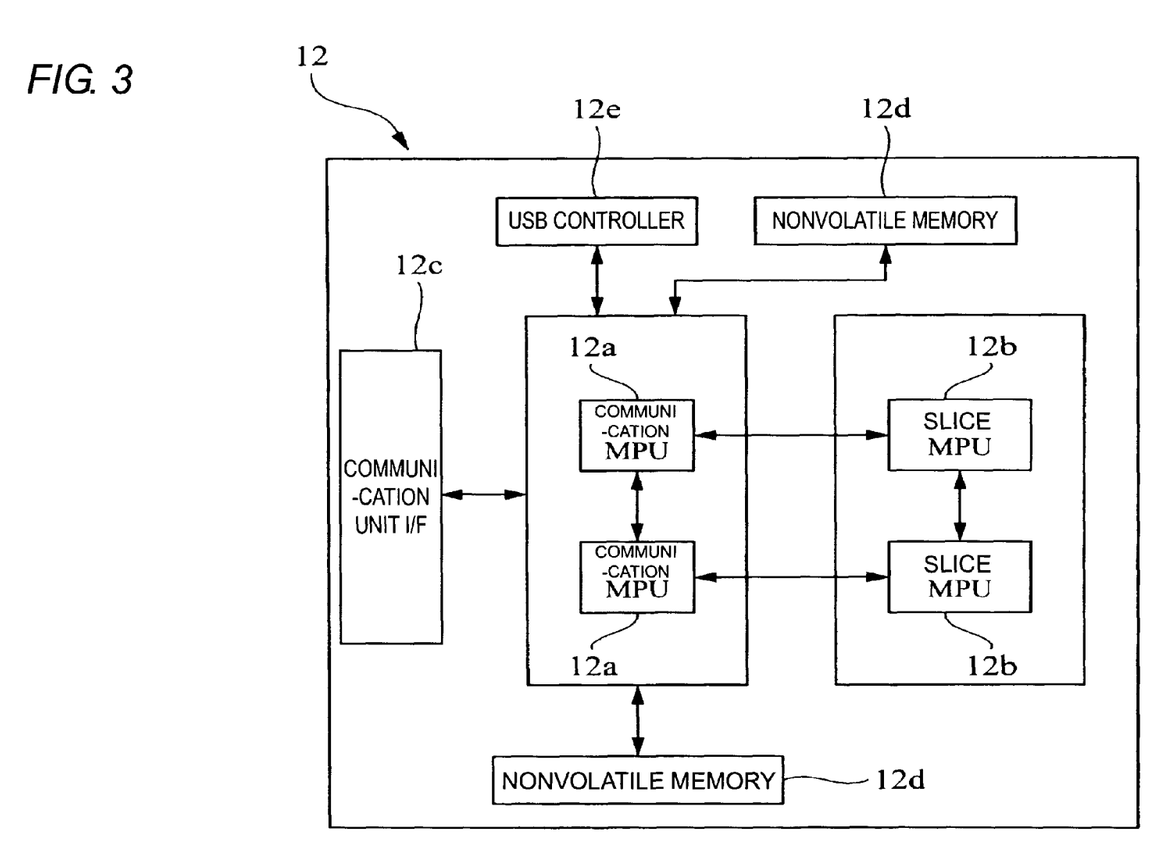
FIG. 3 is a view showing an internal configuration of a CPU unit.

As shown in FIG. 3, the CPU unit 12 includes a communication MPU 12a, a slice MPU 12b, a communication unit interface 12c, a nonvolatile memory 12d, and a USB controller 12e. As the CPU unit 12 is safety compatible, the communication MPU 12a, the slice MPU 12b, and the nonvolatile memory 12d are duplicated.

The communication unit interface 12c is an interface for transmitting and receiving data with the communication unit 11. The communication MPU 12a has a function of transmitting and receiving data with the MPU 11a of the communication unit 11, and storing the set data from the setting tool device 1 received through the communication unit 11 in the nonvolatile memory 12d such as an EEPROM. The CPU unit 12 includes the USB controller 12e, and thus is directly connected with the setting tool device 1 by USB connection, and can acquire the set data from the setting tool device 1 without passing through the communication unit 11 and store the same in the nonvolatile memory 12d.

The slice MPU 12b has a function of transmitting and receiving data with the slice IN unit 13 and the slice Out unit 14, and executing various types of operation processes based on the acquired data. In relation with the present invention, the slice MPU 12b sets the set data (number specifying the diagnosis algorithm to use) for executing the diagnosis algorithm in the register 21 of the slice In unit 13 and the slice Out unit 14. The slice MPU 12b inputs the input signal of the safety input device 5 connected to the slice In unit 13, performs logical operation on the ON/OFF of the input signal by the logic program stored in advance to obtain the output signal, and outputs the output signal based on the operation result to the slice Out unit 14.

Figure 4:
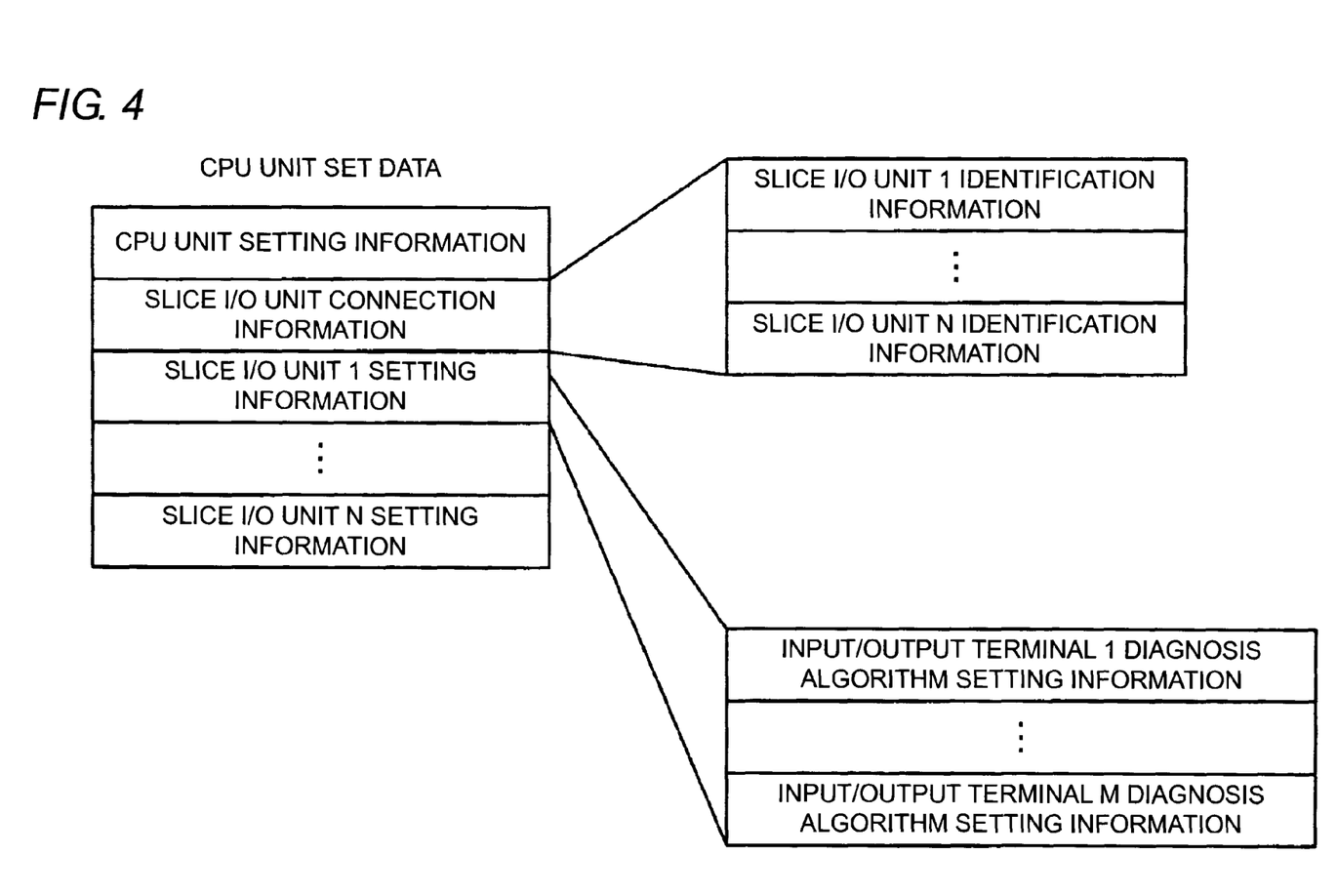
FIG. 4 is a view showing one example of a data structure in a nonvolatile memory.

The nonvolatile memory 12d stores the CPU unit set data shown in FIG. 4. The CPU unit set data is downloaded from the setting tool device 1 and stored. The CPU unit set data includes CPU unit setting information, slice I/O unit connection information, and slice I/O unit setting information.

The CPU unit setting information is a setting parameter of the CPU unit itself. The slice I/O unit connection information is identification information for specifying the connected slice I/O unit, and includes a unit number for specifying the attached location and type (identification information: ID) of the slice I/O unit. The CPU unit 12 (slice MPU 12b) acquires the identification information of the actually coupled slice I/O unit, compares the acquired identification information with the slice I/O unit connection information, and checks if the correct slice I/O unit is attached to the correct position. If the slice I/O unit different from the setting information is attached, the CPU 12 prohibits the operation of the slice I/O unit. That is, the CPU unit 12 has a function of turning ON/OFF the operation of the slice I/O unit.

The slice I/O unit setting information includes diagnosis algorithm setting information, i.e., specifying information for specifying the diagnosis algorithm used with respect to the safety device connected to the input/output terminal in each slice I/O unit. In other words, a plurality of safety devices 5, 6 can be connected to the slice I/O unit, and in particular, if different types of safety devices are attached, the diagnosis algorithm to use differs for every safety device. The diagnosis algorithm to use is set for every input/output terminal of the slice I/O unit. The diagnosis algorithm setting information is specifically a number specifying one of the plurality of diagnosis algorithms stored in the ASIC. The CPU 12 (slice MPU 12b) sets the information for specifying the diagnosis algorithm to use to the register 21 of the ASICs 13a, 14a of each slice I/O unit according to the slice I/O unit setting information. The register 21 stores the information for specifying the diagnosis algorithm to use for every input/output terminal.

Although not illustrated, the CPU unit 12 also includes a system ROM and a user program storage portion for storing a program to be executed by the MPU, RAM functioning as a work memory and an I/O memory when performing the operation, and the like.

Figure 5:
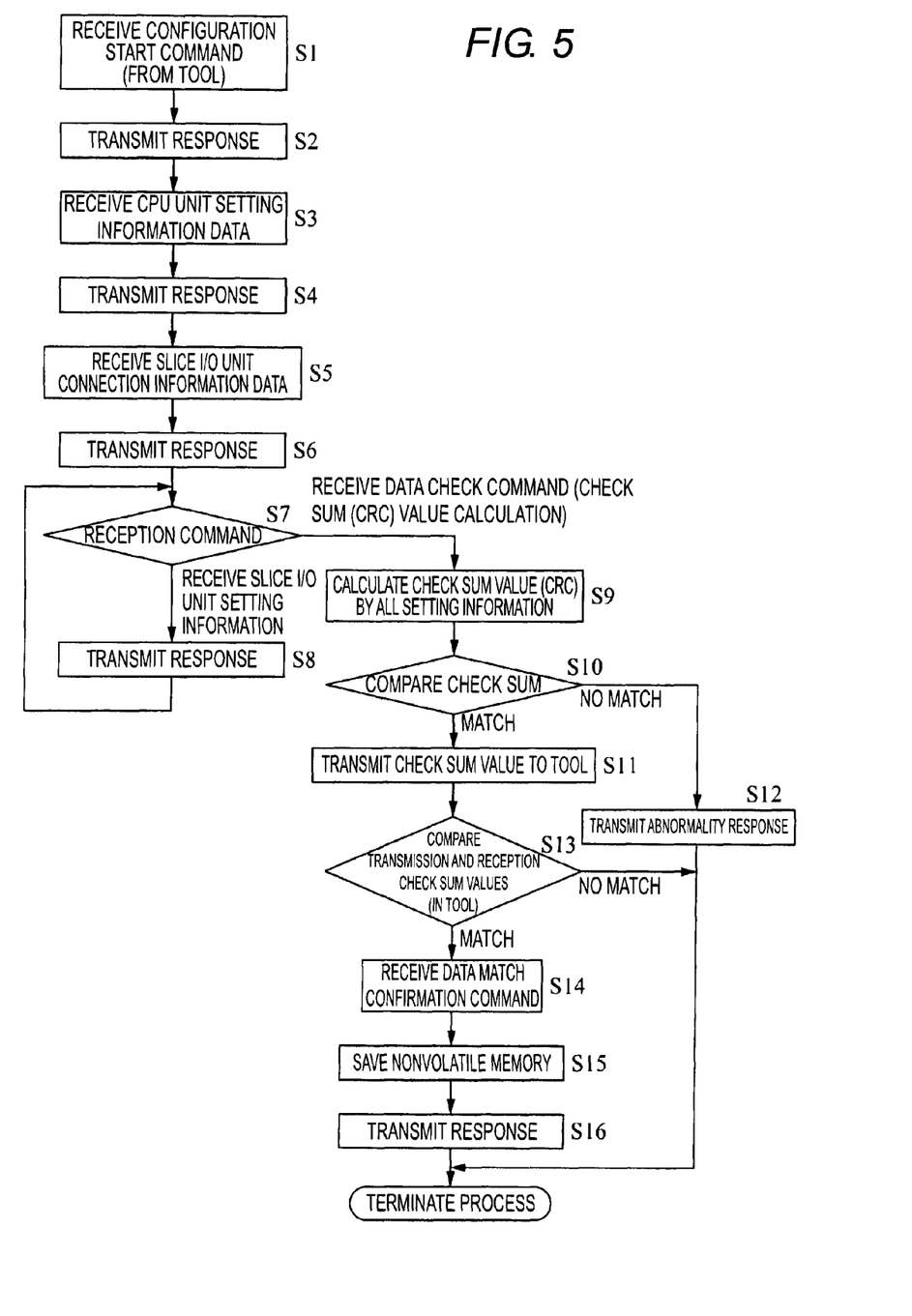
FIG. 5 is a flowchart showing a function of performing a process of storing set data in the nonvolatile memory.

The functions of the setting tool device 1 and the CPU unit 12 will now be described while describing the process (setting process from the setting tool device 1 to the CPU unit 12) procedure for storing the set data in the nonvolatile memory 12d with reference to FIG. 5.

The user operates the setting tool device 1 to transmit the start command from the setting tool device 1 to the CPU unit 12. When receiving a configuration start command transmitted from the setting tool device 1 (S1), the CPU unit 12 creates and transmits a response with respect thereto (S2).

When receiving the response from the CPU unit 12, the setting tool device 1 transmits the CPU unit setting information. When receiving the CPU unit setting information transmitted from the setting tool device 1 (S3), the CPU unit 12 creates and transmits the response thereto (S4). The received CPU unit setting information is temporarily stored and held in the buffer and the like.

When receiving the response from the CPU unit 12, the setting tool device 1 transmits the slice I/O unit connection information. When receiving the slice I/O unit connection information transmitted from the setting tool device 1 (S5), the CPU unit 12 creates and transmits the response with respect thereto (S6). The received slice I/O unit connection information is temporarily stored and held in the buffer and the like.

When receiving the response from the CPU unit 12, the setting tool device 1 transmits the check sum command on the slice unit setting information or the transmitted information, and thus the CPU unit 12 waits for the reception of the reception command (S7), and creates and transmits the response if the received command is the slice I/O unit setting information (S8). The received slice I/O unit setting information is temporarily stored and held in the buffer and the like.

If the received command is the check sum command, the CPU unit 12 obtains the check sum value from the received setting information that is being temporarily stored and held (S9), and compares the same with the check sum value received from the setting tool device 1 (S10). If the check sum values do not match, the CPU unit 12 transmits an abnormal response to the setting tool device 1 and terminates the process (S12). If the check sum values match in branch determination of the processing step S10, the CPU unit 12 transmits the calculated check sum value to the setting tool device 1 (S10).

The setting tool device 1 compares the check sum value (transmission check sum value) it obtained and transmitted in advance with respect to the CPU unit 12 and the check sum value (reception check sum value) transmitted from the CPU unit 12 (S13), and terminates the process if the check sum values do not match. If the check sum values match, the setting tool device 1 transmits a data match confirmation command.

When receiving the data match confirmation command (S14), the CPU unit 12 saves various types of information that are temporarily stored in the nonvolatile memory 12d (S15), and terminates the process after transmitting the response (S16). If the setting tool device 1 side is to be terminated as in the figure when the comparison result of the check sum values in the setting tool device 1 is no-match, the CPU unit 12 discards the temporarily storing data, and does not save the data in the nonvolatile memory 12*d* when not receiving the data match confirmation command even after a constant time has elapsed. If the check sum values do not match in the branch determination of the processing step S13, the setting tool device 1 transmits the data no-match command, and the CPU unit 12 discards the temporarily storing data, and does not save the data in the nonvolatile memory 12*d* when receiving the data no-match command.

Thus, the check by the check sum value is performed in the CPU unit 12 side and the setting tool 1 side, and legitimately saved when matched on both sides, and thus accuracy of information to be stored in the nonvolatile memory 12*d* is improved.

Figure 6:
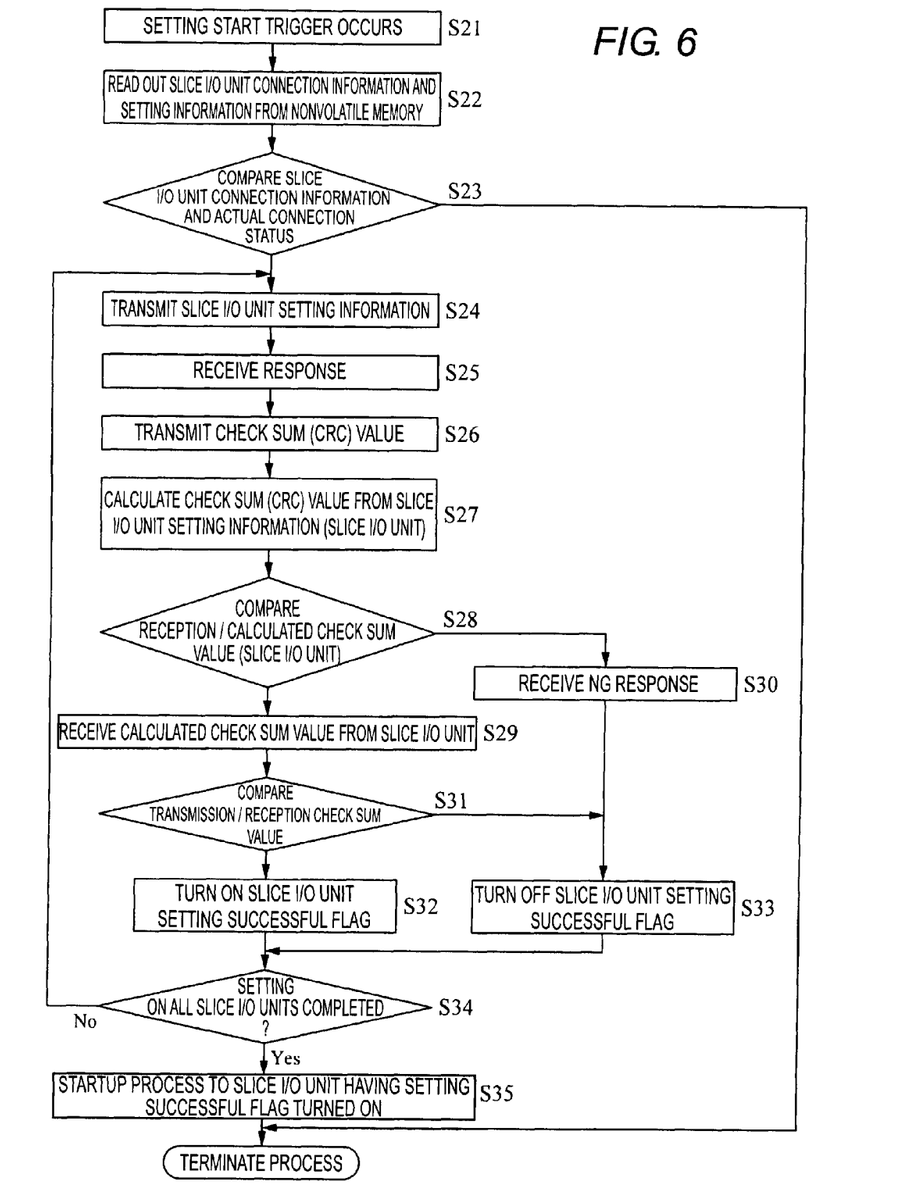
FIG. 6 is a flowchart showing a function of performing a setting process on the slice I/O unit.

The functions of the setting tool device 1 and the CPU unit 12 will now be described while describing the process (setting process from CPU unit 12 to slice I/O unit) procedure for storing the slice I/O unit setting information stored in the nonvolatile memory 12*d* in the slice I/O unit with reference to FIG. 6.

The CPU unit 12 has a function of transmitting the saved setting parameter to the slice I/O unit with one of startup, pushing of switch, or reception of execution command from the setting tool device as a trigger. In other words, when such a trigger occurs (S21), the CPU unit 12 reads out the slice I/O unit connection information and the slice I/O unit setting information stored in the nonvolatile memory 12*d* (S22).

The CPU unit 12 acquires the connection position and the recognition information of the slice I/O unit that is actually connected, and compares the same with the read slice I/O unit connection information (S23). The process is terminated when the comparison result is no-match, and the CPU unit 12 transmits the corresponding slice I/O unit setting information to a predetermined I/O unit (S24) according to the read slice I/O unit connection information when the comparison result is match. The predetermined slice I/O unit that is targeted is, in order, from the unit having a small unit number. This does not exclude transmission in other orders.

The slice I/O unit returns the response when receiving the slice I/O unit setting information, and thus the CPU unit 12 waits for the reception of the response. The CPU unit 12 transmits the check sum value (S26) when receiving the response (S25).

The slice I/O unit that received the check sum value calculates the check sum value from the slice I/O unit setting information received in advance (S27), and compares the same with the received check sum value (S28). The slice I/O unit transmits an abnormality response to the CPU unit 12 if the check sum values do not match, and transmits the calculated check sum value to the CPU unit 12 if the check sum values match.

When receiving the abnormality response (S30), the CPU unit 12 turns OFF the slice I/O unit setting successful flag to be processed (S33). When receiving the check sum value transmitted from the slice I/O unit (S29), the CPU unit 12 compares the check sum value (transmission check sum value) it obtained and transmitted in advance and the check sum value (reception check sum value) transmitted from the slice I/O unit (S31). The CPU unit 12 turns ON the slice I/O unit setting successful flag to be processed if the check sum values match (S32). The CPU unit 12 turns OFF the slice I/O unit setting successful flag to be processed if the check sum values do not match (S33).

Whether or not the setting on all slice I/O units is completed is determined (S34), where the process returns to the processing step S24 if a non-set unit is present, and performs the transmission to the next slice I/O unit. If the setting on all slice I/O units is completed, the CPU unit 12 performs the startup process on the slice I/O unit which setting successful flag is turned ON (S35).

Thus, only the correct slice I/O unit as indicated in the slice I/O unit connection information, the slice I/O unit being such that the correct diagnosis algorithm number is registered in the register 21 as indicated in the slice I/O unit setting information, is started up, whereby the unit can be safely operated. The timing of writing the slice I/O unit setting information (number specifying the diagnosis algorithm to use) transmitted from the CPU unit 12 to the register 21 is conditional on determining that the check sum values match in the slice I/O unit. The information may be received from the CPU unit 12 and written to the register 21 before making the matching determination. Even if the information is stored in the register 21 with the reception, the slice I/O unit cannot be started in the processing step S35 unless the check sum values ultimately match on the CPU unit 12 side and the slice I/O unit side, and thus problems do not arise even if the information is registered in the register in advance.

According to the present embodiment, the information for specifying the diagnosis algorithm to use in each slice I/O unit (slice I/O unit setting information) is saved in the nonvolatile memory 12*d* of the CPU unit 12. Therefore, even if the slice I/O unit is replaced, the setting information for specifying the diagnosis algorithm to use on the newly attached slice I/O unit from the CPU unit can be registered if the same type of slice I/O unit is attached. Therefore, a human error is less likely to occur, and the safety environment can be reliably and easily maintained when registering such setting information.

When replacing the type of safety device, the setting can be easily performed by simply rewriting the setting information stored in the register with the setting information (number) specifying the diagnosis algorithm corresponding to the new safety device.

In the above-described embodiment, an example of being applied to a safety compliant safety controller has been described, but the present invention is not limited thereto, and may be applied to a normal programmable controller (I/O unit).

What is claimed is:

1. An I/O unit for an industrial controller including a connection terminal for connecting an I/O device as an input device and an output device, and a control unit for inputting/outputting an I/O signal with the I/O device; the I/O unit comprising:
   a storage unit for storing a plurality of selectable diagnosis algorithms each corresponding to a different I/O device;
   a specifying information storage unit configured with an input connection for receiving and for storing specifying information for specifying one of the diagnosis algorithms to use of the plurality of selectable diagnosis algorithms;
   a diagnosis unit for performing a diagnosis of the I/O device connected to the connection terminal using the diagnosis algorithm specified by the specifying information stored in the specifying information storage unit of the plurality of diagnosis algorithms; and
   a unit for executing an abnormality process when a diagnosis result of the diagnosis unit is abnormal.

2. An industrial controller comprising the I/O unit according to claim 1, and a CPU unit, wherein the CPU unit has a function of storing and holding the specifying information, and setting the stored and held specifying information to the I/O unit; and further comprising:

a transmitter for transmitting the specifying information to the specifying information storage unit in the I/O unit.

3. The industrial controller according to claim 2, wherein the CPU unit has I/O unit connection information for specifying identification information and an attaching position of the I/O unit to be connected; and the CPU unit has a function of referencing the I/O unit connection information and transmitting the specifying information when confirmed as a correct I/O unit in setting the specifying information to the I/O unit.

4. The industrial controller according to claim 2, wherein the CPU unit has a function of setting the I/O unit to operable when the specifying information is normally transmitted to the I/O unit.

5. The industrial controller according to claim 2, wherein the I/O unit has a function of determining whether or not the specifying information from the CPU unit is normally received, and disabling the control unit from operating when the specifying information is not normally received.

6. The industrial controller according to claim 2, wherein the CPU unit has a function of starting the setting to the I/O unit with one of startup, pushing of a switch, or reception of an execution command from a setting tool device connected to the CPU unit as a trigger.

7. The industrial controller according to claim 4, wherein the I/O unit has a function of determining whether or not the specifying information from the CPU unit is normally received, and disabling the control unit from operating when the specifying information is not normally received.

8. The industrial controller according to claim 4, wherein the CPU unit has a function of starting the setting to the I/O unit with one of startup, pushing of a switch, or reception of an execution command from a setting tool device connected to the CPU unit as a trigger.

9. The industrial controller according to claim 5, wherein the CPU unit has a function of starting the setting to the I/O unit with one of startup, pushing of a switch, or reception of an execution command from a setting tool device connected to the CPU unit as a trigger.

* * * * *